United States Patent
Berbert et al.

(10) Patent No.: US 8,047,368 B2
(45) Date of Patent: Nov. 1, 2011

(54) VACUUM SKIN PACKAGING LAMINATE, PACKAGE AND PROCESS FOR USING SAME

(75) Inventors: Otacilio Teixeira Berbert, Oshkosh, WI (US); Douglas Mark Latreille, Neenah, WI (US)

(73) Assignee: Curwood, Inc., Oshkosh, WI (US)

( * ) Notice: Subject to any disclaimer, the term of this patent is extended or adjusted under 35 U.S.C. 154(b) by 953 days.

(21) Appl. No.: 12/018,261

(22) Filed: Jan. 23, 2008

(65) Prior Publication Data

US 2009/0184019 A1    Jul. 23, 2009

(51) Int. Cl.
*B65D 67/00* (2006.01)
*B65D 11/52* (2006.01)
*B65D 65/28* (2006.01)
*B65D 31/02* (2006.01)

(52) U.S. Cl. ............. 206/497; 53/427; 428/43; 426/404
(58) Field of Classification Search ............... 428/43, 428/44; 206/497; 53/427, 433; 426/404
See application file for complete search history.

(56) References Cited

U.S. PATENT DOCUMENTS

| RE30,009 E | 5/1979 | Perdue et al. |
| 4,340,138 A * | 7/1982 | Bernhardt ..................... 206/216 |
| 5,115,624 A | 5/1992 | Garwood |
| 2002/0012803 A1* | 1/2002 | Kending ..................... 428/423.7 |
| 2006/0269707 A1* | 11/2006 | Berbert ......................... 428/35.7 |

FOREIGN PATENT DOCUMENTS

JP    63-83186    * 4/1988

* cited by examiner

*Primary Examiner* — Rena Dye
*Assistant Examiner* — Yan Lan
(74) *Attorney, Agent, or Firm* — Tom J. Hall

(57) ABSTRACT

The present invention is directed to vacuum skin packaging laminates. The laminates include a first film, a second film, an adhesive bonding the first film to the second film, and an adhesive-free interfacial section between the first and second films. The laminate is adapted to provide substantially horizontal first film-surface above the product for displaying product markings and a thermoformable second film-surface for conforming to the shape of the product. The present invention also is directed to vacuum skin packages formed from such laminates, and methods of packaging a product.

8 Claims, 4 Drawing Sheets

VACUUM SKIN PACKAGING LAMINATE, PACKAGE AND PROCESS FOR USING SAME

TECHNICAL FIELD

This invention relates to the field of packaging. Particularly, the present invention relates to packaging laminates suitable for use in vacuum skin packaging applications, packages constructed from such laminates and methods of packaging a product.

BACKGROUND OF THE INVENTION

Vacuuming skin packaging (VSP) process is well known in the art and various apparatus and processes have been described, for example, in U.S. Pat. Nos. 3,835,618; 3,950,919 and Re 30,009, all issued to Perdue. The vacuum skin packaging process is in one sense a type of thermoforming process in which an article to be packaged serves as the mold for the thermoform. An article may be placed on a support member, such as a rigid or semi-rigid card, tray or other bottom support member; the supported article is then passed to a chamber where a film can be either heated and draped over the article, or drawn upwards against a heated dome and then, draped over the article. The movement of the film may be controlled by vacuum and/or air pressure; and in a vacuum skin packaging arrangement, the interior of the container may be evacuated before final sealing of the film to the support. Typically, thermoformable materials may be used as the draping film. Examples of vacuum skin packaging trays, films and processes are disclosed in U.S. Pat. No. 4,611,456 to Gilliotos et al; U.S. Pat. No. 5,846,582 to Mayfield et al.; and U.S. Pat. No. 5,916,613 to Stockley III., which are hereby incorporated by reference herein.

Vacuum skin packaging applications may include packaging of perishable or non-perishable food products, such as, e.g., fresh red meat and sliced cheese, or frozen food products, such as frozen fish, poultry and the like. Typically, the packaging material for oxygen-sensitive food and non-food products require lower oxygen permeability compare to that for non-oxygen sensitive products. For example, U.S. Patent Application Publication No. 2006/0269707 to Otacilio Berbert, the disclosure of which is hereby incorporated herein by reference, describes several multilayer thermoformable films suitable for use in vacuum skin packaging applications of perishable food products. The disclosure demonstrates that VSP films can be modified to provide an oxygen transmission rate of from about 0-2.0 cm$^3$/100 in$^2$/24 hours at 0% R.H. and 23° C. These films include an oxygen barrier layer comprising ethylene/vinyl alcohol copolymer and a surface-treated sealing layer comprising polyethylene vinyl acetate copolymer.

Generally, labels and printed indicia are located on a package where it may be viewed by the consumer. Typically, these markings are positioned on a relatively smooth, flat upper surface of the package which allows the consumer to read product information without having to handle the package. Indicia on vacuum skin packages become illegible when located on the upper surface of the packaging film formed to an irregularly shaped product. For this reason, vacuum skin packaging often includes an over-packaging technique, e.g., the use of an overwrap film, a paperboard sleeve or a carton box, which covers the vacuum skin package and provides a flat surface for printed information. However, over-packaging is an extra cost to the manufacturer, and labels and other printed information applied underneath the package are not attractive to consumers who are accustomed to viewing the product and product information together.

Thus, it is an object of the present invention to overcome the labeling difficulties of the prior art.

It is also an object of the present invention to provide a flexible packaging laminate for vacuum skin packaging applications.

It is also an object of the present invention to provide a flexible packaging laminate which separates into two films when subjected to heat and differential air pressure thereby forming a substantially horizontal first film-surface above a product and a thermoformable second film-surface enclosing the product.

It is yet another object of the present invention to provide a vacuum skin package.

It is yet another object of the present invention to provide a vacuum skin package which provides a substantially horizontal film-surface disposed above the product and a thermoformed film-surface surrounding the exterior shape of the product.

It is yet still another object of the present invention to provide a method of vacuum skin packaging a product using a single flexible laminate.

BRIEF SUMMARY OF THE INVENTION

These as well as other objects are achieved by providing a flexible packaging laminate comprising a first film, a second film and an adhesive which adheres the first film to the second film, and an adhesive-free interfacial section between the first and second films. The adhesive-free interfacial section includes an unbound portion of the first film and an unbound portion of the second film. The unbound portion of the first film includes at least one perforation, cut or score-line, extending through the entire thickness of the first film, and the unbound portion of the second film which is free of a perforation, cut and score-line. The unbound portions of the first and second films are adapted to separate from each other such that unbound portion of the second film can be drawn towards a product and the unbound portion of the first film remains substantially undistorted during a vacuum thermoforming process.

The objects of the invention are further achieved by providing a package comprising a product-support member having an elevated distal flange, a product being supported on the product-support member, and a single flexible laminate having at least two opposing perimeter edges heat sealed to the distal flange. The flexible laminate comprises a first film being adhesively joined to a second film, and an adhesive-free interfacial section between the first and second films, wherein the adhesive-free interfacial section includes an unbound portion of the first film and an unbound portion of the second film. The package further includes a substantially horizontal film-surface comprising the unbound portion of the first film. The substantially horizontal film-surface is positioned above the product and parallel with a plane defined between at least two opposing edges of the distal flange. The package still further includes a thermoformed film-surface conformed to the exterior shape of the product which comprises the unbound portion of the second film.

The objects of the invention are yet further achieved by providing a method for packaging a product. The method comprises the steps of: a) providing a product-support member having an elevated distal flange; b) positioning the product on the product-support member; c) providing a single flexible laminate comprising a first film being adhesively joined to a second film, and having an adhesive-free interfacial section between the first and second films, wherein the adhesive-free interfacial section comprises an unbound portion of the first film and an unbound portion of the second film; d) heating the laminate; e) evacuating the space between both the laminate and product-support member, and subsequently pressurizing the space between both the laminate and product-support member to separate the unbound portion of the first film from the unbound portion of the second film; f) conforming the unbound portion of the second film around the exterior shape of the product; and g) sealing at least two opposing perimeter edges of the laminate to the distal flange thereby providing a substantially horizontal film-surface disposed above the product. The substantially horizontal film-surface includes the unbound portion of the first film which is parallel with a plane defined between two opposing edges of the distal flange. Those skilled in the art will recognize that process steps of conforming the second layer to the exterior shape of the product and sealing the laminate to the flange may by accomplished either simultaneously or sequentially. The method of the present invention may further include the steps of printing indicia on a surface of unbound portion of the first film and placing a printed label on the unbound portion of the first film.

Embodiments of the present invention provide the advantage of eliminating the need for two or more individual packaging webs for vacuum skin packages bearing product markings clearly visible to the consumer by reducing the number of webs to a single laminate. The present invention is particularly beneficial to the food packaging industry for vacuum skin packaging of irregularly shaped food products since only a single laminate is needed. The present invention may reduce the cost and complexity of the packaging process.

BRIEF DESCRIPTION OF SEVERAL VIEWS OF THE DRAWINGS

A detailed description of preferred embodiments of the invention follows: with reference to the drawings, wherein.

DETAILED DESCRIPTION OF THE INVENTION

Figure 1:
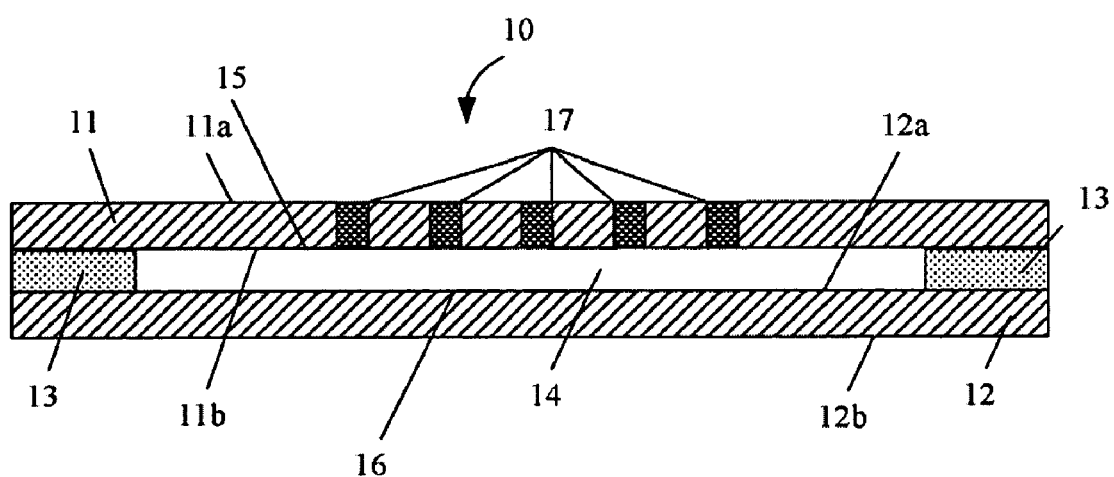
FIG. 1 is a cross-sectional view of one embodiment of the laminate of the present invention.

As used herein, the terms "lamination" and "laminate" refers to the process and resulting product made by bonding together two or more films or film layers together. Lamination can be accomplished by joining layers together with adhesives, with heat and pressure, with spread coating and/or with extrusion coating. The term film is also inclusive of coextruded multilayer films.

The term "thermoplastic" describes a material that softens when exposed to heat and which substantially returns to a non-softened condition when cooled to room temperature. In some embodiments of the present invention, the first layer or the second layer, and preferable, at least the second layer of the film, comprises a thermoplastic material. Alternatively, both the first and second layers of the film include a thermoplastic material.

The term "polymers" includes, but is not limited to, homopolymers, copolymers, such as for example, block, graft, random and alternating copolymers, terpolymers, etc. and blends and modifications thereof. Furthermore, unless otherwise specifically limited, the term "polymer" shall include all possible configurational isomers of the material. These configurations include, but are not limited to isotactic, syndiotactic and atactic symmetries The term "adhesive" refers to a layer or material placed on one or more layers to promote the adhesion of that layer to another surface. Unless otherwise indicated, an adhesive layer can have any suitable composition that provides a desired level of adhesion with the one or more surfaces in contact with the adhesive layer material. Adhesives have been generally described in Kirk-Othmer-Adhesives; pg. 445-466; Vol. 1; 1991, by Aldopbus Pocius, the disclosure of which is incorporated herein. Preferably, the adhesive is any packaging adhesive which may fluid adhesives, solvent-based adhesives, and solvent-free adhesives. As used herein, the phrase "fluid adhesive" refers to any substance, inorganic or organic, natural or synthetic, that tends to flow under pressure and/or heat at a rate sufficient of coat a layer in a commercial process. Suitable fluid adhesives may have a wide range of viscosities at room temperature and may have a variety of forms, which include, but are not limited to, for example, solutions, dispersions, emulsions, pastes, mastics, and the like. Suitable organic, adhesives may include natural adhesives, i.e., for example, hide and bone glue, fish glue, rubber latex, terpene resins, and mucilages, and synthetic adhesives, which include, but are not limited to polyvinyl acetate emulsions, ethylene/vinyl acetate copolymers, polyurethanes, silicone polymers, cyanoacrylates, epoxy, isocyanates and the like. Fluid adhesives may further include hot-melt adhesives, for example, pressure-sensitive adhesives. Pressure-sensitive adhesives may include, but are not limited to, tackified rubber adhesives, such as natural amber, olefins, silicones, polyisoprene, polybutadiene, polyurethanes, styrene-isoprene-styrene and styrene-butadiene-styrene block copolymers, and other elastomers; and tackified or untackified acrylic adhesives such as copolymers of isooctylacrylate and acrylic acid, which can be polymerized by radiation, solution, suspension, or emulsion techniques. As used herein, the phrase "solvent-based adhesive" refers to an adhesive system which comprises an adhesive and at least one solvent and requires that the solvent be removed by evaporation (drying) after the solvent-based adhesive is applied to at least one film substrate, layer and the like. A solvent-based adhesive may include a solvent such as conventional petrochemical-based solvents, i.e., for example, but not limited to, alcohols, toluene, esters, and the like, a water-based solvent, and combinations thereof. As used herein, the phrase "solvent-free adhesive" refers to an adhesive system which comprises an adhesive and may include a solvent, but does not require that the solvent be removed by evaporation after the solvent-free adhesive is applied to a film substrate, layer and the like. A solvent-free adhesive may also comprise a solvent-free adhesive which is diluted with a conventional petrochemical-based or water-based solvent prior to coating in order to facilitate Its application. Solvent-free adhesives may further comprise radiation-curable adhesives which polymerize and/or cross-link when exposed to ultraviolet light or ionizing radiation sources. Useful types of ionizing radiation sources include electron beam (e-beam), X-ray, corona discharge, and the like, with the former being preferred. Suitable radiation-curable adhesives are well known such as those described in, for example, U.S. Pat. Nos. 4,256,828; 4,593,051; 5,328,940; 6,617,031; 6,472,056; and U.S. Patent Application Publication No. 2003/0161976, which are incorporated herein by reference.

As used herein, the term "gas-permeable" refers to any film or film layer having an oxygen transmission rate therethrough of greater than 5, 10, 20, 50, 100, 500, 1,000 or 10,000 $cm^3/100$ $in^2/24$ hours measured at 0% relative humidity and 23 degrees C.

As used herein, the phrases "sealing layer" and "sealant layer," refer to a film or an outer film layer involved in the sealing of a laminate to itself; to another laminate or film layer, and/or to a container. In general, the sealing layer is an interior surface and may be of any thickness. The interior surface may also serve as a product-contact surface. In certain embodiments, the sealing layer may be a heat sealing layer. In other embodiments, the sealing layer may be any suitable adhesive material.

The term "heat sealing layer" refers to a sealing layer which is heat seal able (i.e., capable of fusion bonding by conventional indirect heating means which generate sufficient heat on at least one film contact surface for conduction to the contiguous film contact surface and formation of a bond interface therebetween without loss of the layer integrity). The bond interface between contiguous inner layers preferably has sufficient physical strength to withstand the packaging process and subsequent handling including, for example, tensions resulting from stretching or shrinking attendant with the presence of a food body sealed within a package utilizing a film having a heat sealable layer. Advantageously, the bond interface is preferably sufficiently thermally stable to prevent gas or liquid leakage therethrough when exposed to above or below ambient temperatures, such as those during one or more of the following: packaging operations, storage, handling, transport, display or processing of food. Heat seals may be designed to meet different conditions of expected use and various heat seal formulations are known in the art and may be employed with the present disclosure. In certain optional embodiments, heat seals may be subjected to pasteurization or cook-in temperatures and conditions, for example, in sealed bag, vacuum skin package (VSP) or sealed tray form. For use in cook-in applications, heat seals should withstand elevated temperatures up to about 160-180° F. (71-82° C.) or higher, for example, 212° F. (100° C.) for extended periods of time, such as up to 4 to 12 hours in environments which may range from heated humidified air or steam to submersion in heated water Preferably, the sealing layer is heat sealable to itself, but may be sealable to other objects, films or layers, such as to a tray when used as a lidding film or to an outer layer in a lap seal or in certain tray overwrap embodiments. In other embodiments, the heat sealing layer or the heat sealing layer and adjacent interior layers may be adapted to be peelable from itself or other objects. Also, in certain embodiments, the heat sealing layer may also serve as a product-contact layer.

By the term "substantially horizontal" it is meant that the majority of a film surface is substantially parallel to a plane defined between two opposing edges of a distal flange of a package.

Although specific embodiments of the present invention will now be described with reference to the drawings, it should be understood that such embodiments are by way of example only and merely illustrative of but a small number of the many possible specific embodiments which can represent applications of the principles of the present invention.

FIG. 1 depicts a partial cross-sectional diagram of one embodiment of laminate 10 in accordance with the present invention. Laminate 10 is shown comprising a first film 11 having a first surface 11a and an opposing second surface 11b; a second film 12 having a first surface 12a and an opposing second surface 12b; an adhesive 13; and an adhesive-free interfacial section 14. Second film 12 may include a sealing layer (not shown). When the second film 12 has a monolayer structure, the second film 12 serves as the sealing layer. In other embodiments, one or both films 11 and 12, may have a multi-layer structure and comprise a thermoplastic material, a non-thermoplastic material or a combination of thermoplastic and non-thermoplastic materials. When second film 12 has a monolayer structure, second film 12 comprises a thermoplastic material. Suitable thermoplastic materials for use in the present invention may comprise any natural and synthetic plastic, which may include, for example, but is not limited to, homopolymers and copolymers of the following resins: poly olefins, such as, low density polyethylenes. i.e., ultra- and very-low density polyethylene, linear-low density polyethylene, homogeneous and heterogeneous catalyzed low density polyethylenes, medium and high density polyethylenes, cyclic olefin copolymers, ethylene vinyl acetate copolymers, polypropylene, polybutylene, polyamides, polyesters, for example, polyethylene terephthalates; ionomers; natural and synthetic rubbers; polycarbonates; and derivates and combinations of these materials. Thermoplastic materials may include fibrous or non-fibrous natural and synthetic plastics. Non-thermoplastic materials may include, but are not limited to, any fibrous or non-fibrous cellulosic material, such as, for example, paper and paperboard.

In accordance with the present invention, first film 11 and second film 12 may each include specific materials which provide one or more particular package or film properties depending upon the manufacturing process used to produce the film and the final package end-use. These properties may include package strength, film peel strength for peelability, product damage protection, openability, reclosability, recycleability, and moisture, aroma, contaminant protection. For example, laminate 10 of the present invention may be adapted to package oxygen-sensitive food and non-food products by providing the second film 12 with one or more oxygen barrier materials. Alternatively, both first film 11 and second film 12 may each comprise one or more oxygen barrier materials. Oxygen barrier materials may be provided as a discrete layer and in combination with non-oxygen barrier materials. Suitable oxygen barrier material may include, but are not limited to, thermoplastic resins such as nylons, ethylene vinyl alcohol copolymers, polyesters, metal and metal oxide coated polymer layers and combinations thereof. When an oxygen barrier material is present in a layer, the layer may have an oxygen transmission rate of less than 50 cm³/100 in²/24 hours, preferably, less than 20 cm³/100 in²/24 hours, and most preferably, between 0 to 5 cm³/100 in²/24 hours measured at 0% relative humidity and 23 degrees C.

Figure 5:
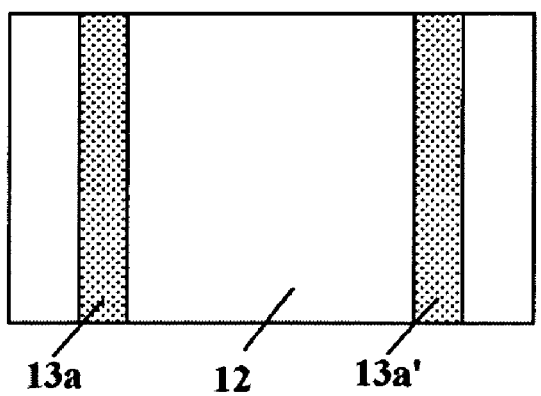
FIG. 5 is a partial top view of one embodiment of the laminate of the present invention having a plurality of continuous adhesive segments applied to the second film.
Figure 6:
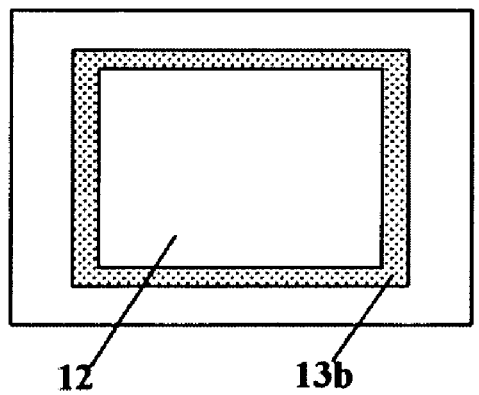
FIG. 6 is a partial top view of another embodiment of the laminate of the present invention having a single continuous adhesive segment applied to the second film.
Figure 7:
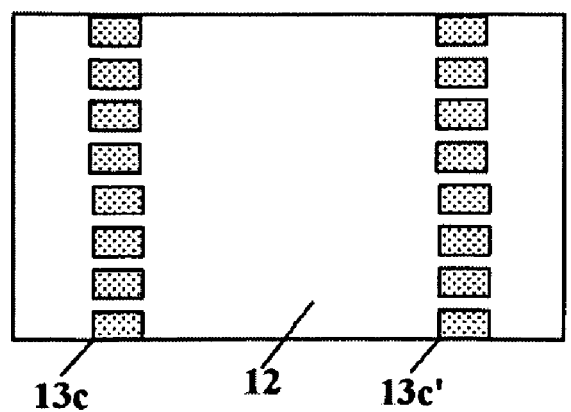
FIG. 7 is a partial top view of another embodiment of the laminate of the present invention having a plurality of intermittent adhesive segments applied to the second film.

As shown in FIG. 1, adhesive 13 is disposed between first and second films, 11 and 12, and preferably, bonds the second surface of first film 11b to the first surface of second film 12a. Adhesive 13 may be clear or transparent, or it may be colored, and may be applied in liquid, semi-solid or solid form to the surface of either one or both films prior to lamination. Alternatively, adhesive 13 may be applied to the surface of one or more films in a predetermined pattern. In one embodiment, adhesive 13 is applied to the surface of either film 11 or 12, such that less than 100%, less than 75%, less than 50%, or less than 25% of the total area of the film surface is covered by the adhesive. In some embodiments, it may be desirable to apply the adhesive as a continuous or intermittent pattern on the surface of one or more films. For example, FIG. 5 illustrates one embodiment of the laminate according to the present invention with adhesive 13 applied to a surface of second film 12 as two continuous adhesive segments, 13a and 13a'. Alternatively, FIG. 6 shows adhesive 13 disposed onto a surface of second film 12 as one continuous segment of adhesive 13b. FIG. 7 further illustrates embodiment of the invention with adhesive 13 applied to a surface of second film 12 as a plurality of intermittent adhesive segments 13c. It is further contemplated that adhesive 13 may be applied to the surface of one or more films in any thickness, width or shape as desired. An example of a suitable adhesive for use in the present invention is Avadyne® AV5210/CA500-83 which may be purchased from Henkel KGaA, Düsseldorf; Germany. The Avadyne® AV5210/CA500-83 system is identified as two-component ethanol-based adhesive having an amine-terminated polyurethane pre-polymer and a epoxy-terminated ether co-reactant.

Figure 3:
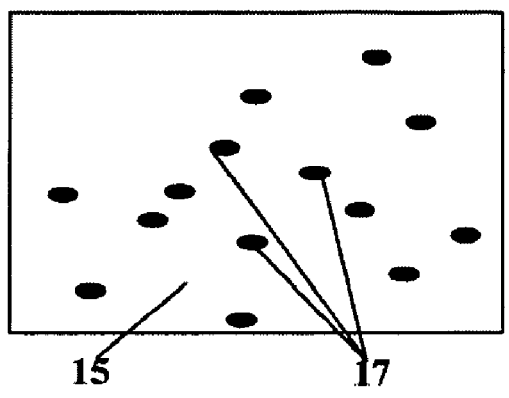
FIG. 3 is a partial top view of one embodiment of the laminate of the present invention having a plurality of perforations in the unbound portion of the first film.
Figure 4:
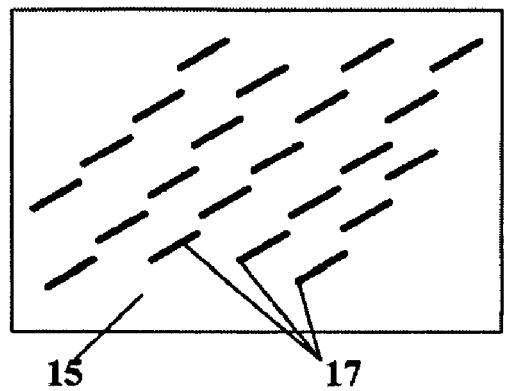
FIG. 4 is a partial top view of another embodiment of the laminate of the present invention having a plurality of cuts or score-lines in the unbound portion of the first film.

Returning to FIG. 1, adhesive-free interfacial section 14 is positioned between first film 11 and second film 12. Adhesive-free interfacial section 14 includes an unbound portion of the first film 15 and an unbound portion of the second film 16. In one preferred embodiment, at least 50% of the total area of each film, 11 and 12, may be encompassed within unbound portion of the first film 15 and unbound portion of the second film 16, respectively. In another embodiment, unbound portion of the first film 15 is a thermoformable film and unbound portion of the second film 16 is a non-thermoformable film. It should be noted that unbound portion of the first film 15 comprises at least one perforation, cut or score-line extending through the entire thickness of first film 11. Preferably, unbound portion of the first film 15 is gas-permeable. As depicted in FIG. 1, unbound portion of the first film 15 includes a plurality of perforations, cuts and score-lines 17. Other variations of perforations, cuts and score-lines which may be suitable for use in accordance with the present invention and are illustrated in FIGS. 3 and 4. In some preferred embodiments, the perforations, cuts and score-lines may be formed in a predetermined pattern in unbound portion of the first film 15. Preferably, the unbound portion of the second film 16 is free of any perforations, cuts or score-lines. It should be appreciated by those skilled in the art that any method may be used to form the perforation, cut or score-line in the first layer. These methods are generally well known and may include mechanical methods using a studded rollers or knives, and optical techniques such as laser beam ablation and the like.

Figure 2:
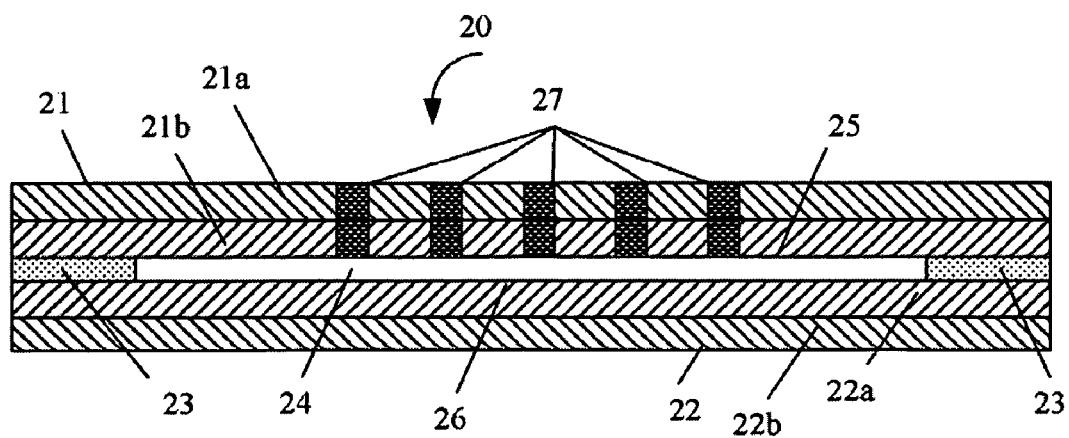
FIG. 2 is a cross-sectional view of another embodiment of the laminate of the present invention.

Turning now to FIG. 2, there is illustrated another embodiment of the packaging laminate according to the present invention. As depicted, laminate 20 comprises a multilayer first film 21 which includes layers 21a and 21b, a multilayer second film 22 which includes layers 22a and 22b. Laminate 20 also includes an adhesive 23 and an adhesive-free interfacial section 24. As shown, adhesive-free interfacial section 24 includes an unbound portion of the first film 25 and an unbound portion of the second film 26. Unbound portion of the first film 25 comprises a plurality of perforations 27 that extend through the entire thickness of first film 21. In this particular embodiment, second layer 22b of second film 22 may function as a sealing layer, preferably, a heat sealing layer.

The length and width of the films 11 and 21 may or may not be coextensive with those of the second films 12 and 22, respectively. In one preferred embodiment, films 11 and 21 are coextensive with second films 12 and 22, respectively. The first and second laminates 10 and 20 in FIGS. 1 and 2 may each have any thickness desired, and preferably has a thickness of between about 0.25 to 20 mil and more preferably, between about 0.5 to 10 mil.

Figure 8:
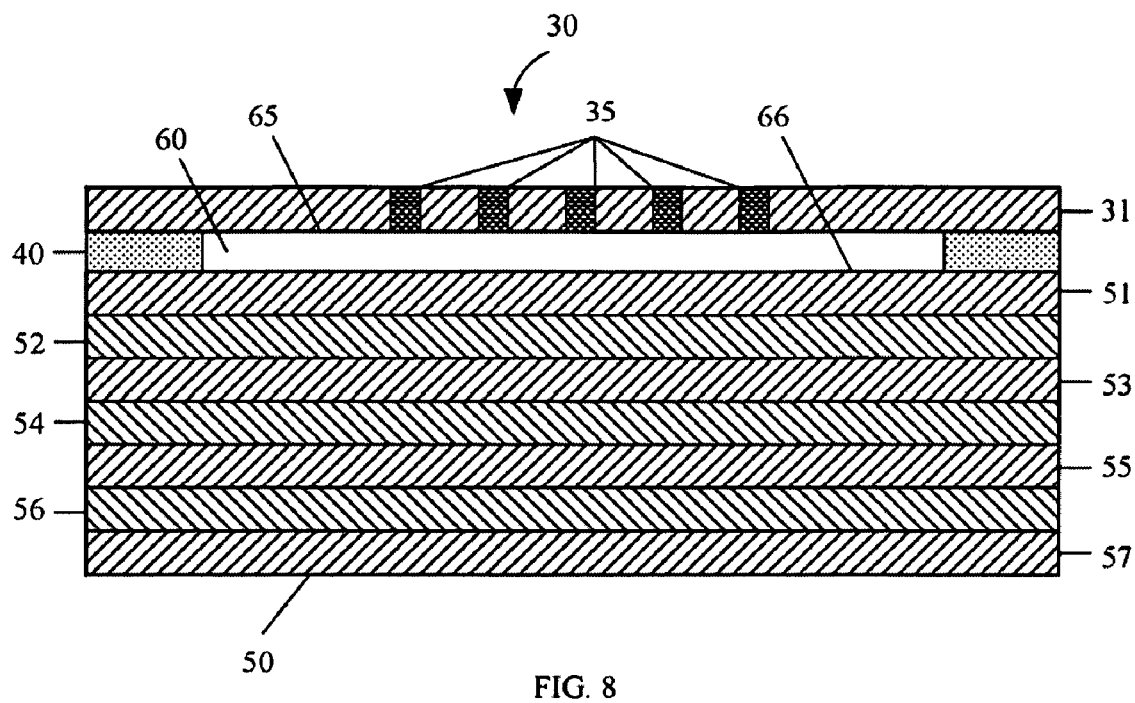
FIG. 8 is a view of another embodiment of the laminate of the present invention.

Depicted in FIG. 8 is flexible laminate 30 which Is another preferred embodiment of a laminate according to the present invention. As illustrated, laminate 30 comprises a monolayer first film 31, an adhesive 40, a multilayer second film 50, and an adhesive-free interfacial section 60. Adhesive-free interfacial section 60 includes an unbound portion of the first film 65 and an unbound portion of the second film 66. First film 31 is a thermoplastic film of oriented polyethylene terephthalate having a thickness of 142 mil (142 gauge) which includes a plurality of perforations, 35 applied in a predetermined pattern therethrough. An example of a suitable oriented polyethylene terephthalate which is commercially available is sold under the trademark Mylar® by DuPont Teijin Films, Hopewell, Va., U.S.A. A particularly suitable example is Mylar® KL1 having a haze value of 0.6%, an elongation at Break in the machine and transverse directions of 120% and 80%, respectively, and a tensile strength in the machine and transverse directions of 33,000 psi and 38,000 psi, respectively. As depicted, second film 50 is a multilayer thermoplastic film comprising seven individual layers, 51 through 57. Layer 51 comprises 91.7% (wt) of a low-density polyethylene having a density of 0.920 g/cm³, a melt index of 1.9 g/10 minutes, a melting point of 110° C., which is identified as LD 134.09 and is available from ExxonMobil Chemical Company, Houston, Tex., United States, and 8.3% (wt) of a mixture of various film and polymer additives. An example of another commercially available low-density polyethylene suitable for use in the present invention includes, but is not limited to, a polyethylene having a density of 0.923 g/cm³, a melt index of 2.6 g/10 minutes, a melting point of 113° C., a Vicat softening point of 97° C., which is sold as Dow™ Polyethylene 608A from the Dow Chemical Company, Midland, Mich., United States. Layers 52 and 56 each include 100% (wt) of an ionomer resin having a melt index of 1.5 g/10 minutes, a Vicat softening point of 73° C., a melting point of 97° C., which is sold under the trademark DuPont™ Surlyn® 1650 and is available from du Pont de Nemours and Company, Inc., Wilmington, Del., United States. Layers 53 and 55 are each a blend of about 75% (wt) of an ethylene/vinyl acetate copolymer having a density of 0.93 g/cm³, a melt index of 0.35 g/10 minutes, a melting point of 95° C., a Vicat softening point of 82° C., which is sold under the trademark DuPont™ Elvax® 3135XZ from du Pont de Nemours and Company, Inc., Wilmington, Del.; and 25% (wt) of an anhydride-modified linear low-density polyethylene having a melt index of 2.7 g/10 minutes, a Vicat softening point of 103° C., a melting point of 115° C., and a density of 0.91 g/cm³, which is sold under the trademark DuPont™ Bynel® 41E710 and is also available from du Pont de Nemours and Company, Inc., Wilmington, Del., United States. Layer 54 comprises an oxygen barrier material of ethylene/vinyl alcohol copolymer having an ethylene content of 38% (wt.), a density of 117 g/cm$^3$, a melt index of 3.2 g/10 minutes, a melting point of 173° C., a glass transition temperature of 58° C., and sold under the trademark Soarnol® ET3803 which is available from Soarus L.L.C., Arlington Heights, Ill., United States. Layer 57 comprises 96% (wt) of an ethylene/vinyl acetate copolymer having a density of 0.93 g/cm$^3$, a melt index of 0.35 g/10 minutes, a melting point of 95° C., a Vicat softening point of 82° C., which is sold under the trademark DuPont™ Elvax® 3135XZ from du Pont de Nemours and Company, Inc., Wilmington, Del.; and 4% (wt) of a mixture of various additives. Layer 57 serves as a sealing layer, preferably, a heat sealing layer. The total thickness of the second film 50 is approximately 6 mil.

Film 50 may be produced using simple blown film processes which are described, for example, in *The Encyclopedia of Chemical Technology*, Kirk-Othmer, Third Edition, John Wiley & Sons, New York, 1981, Vol. 16, pp. 416-417 and Vol. 18, pp. 191-192, the disclosures of which are incorporated herein by reference. Generally, the simple blown film process may include an apparatus having a multi-manifold circular die head through which the film layers are forced and formed into a cylindrical multilayer film bubble. The bubble may be quenched, e.g., via cooled water bath, solid surface and/or air, and then ultimately collapsed and formed into a multilayer film. It is appreciated by a person of ordinary skill in the art that cast extrusion techniques may also be used to fabricate the thermoplastic layer structures of the present invention.

Unless otherwise noted, the polymer resins utilized in the present invention are generally commercially available in pellet form and, as generally recognized in the art, may be melt blended or mechanically mixed by well-known methods using commercially available equipment including tumblers, mixers or blenders. Also, if desired, well-known additives such as processing aids, slip agents, anti-blocking agents and pigments, and mixtures thereof may be incorporated into the polymer layers, by blending prior to extrusion. The resins and any additives may be introduced to an extruder where the resins are melt-plastified by heating and then transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other processing parameters chosen.

In the practice of this invention, it may be desirable to surface-treat the exterior surface of a film or a film layer. The terms "surface-treat" and "surface-treatment" both refer to any technique which alters the surface energy (or surface tension) of a film layer and may include techniques such as, but is not limited to, corona, flame, and plasma treatment, ozone, ultra-high frequency electrical discharge, UV or laser bombardment, chemical priming, and the like. The phrase "corona treatment" refers to, in general, the process wherein an electrical discharge generated by a high-voltage electric field passes through a polymer substrate. It is believed that the electrical discharge or "corona" may ionize the oxygen molecules surrounding the substrate which chemically interact with the surface atoms of the substrate thereby changing the surface energy of the polymer substrate.

It may also be desirable to irradiate the laminate, a film, film layer, to cause crosslinking of at least one or more thermoplastic layers to improve the abuse and/or puncture resistance and other physical characteristics of the laminate. Crosslinking is the predominant reaction which occurs on irradiation of many polymers and results in the formation of carbon-carbon bonds between polymer chains. Crosslinking may be accomplished, for example, by irradiation using high energy electrons, gamma-rays, beta particles and the like. The irradiation source can be any electron beam generator operating in a range of about 150-6000 kilovolts (6 megavolts) with a power output capable of supplying the desired dosage. The voltage can be adjusted to appropriate levels which may be for example 1-6 million volts or higher or lower. Many apparatus for irradiating thermoplastic films are known to those skilled in the art. The most preferred amount of radiation is dependent upon the layer and its end use. One method for determining the degree of "cross-linking" or the amount of radiation absorbed by a material is to measure the "gel content." As used herein, the term "gel content" refers to the relative extent of cross-linking within a polymeric material. Gel content is expressed as a relative percent (by weight) of the polymer having formed insoluble carbon-carbon bonds between polymers and may be determined by ASTM D-2765-01 Test Method, which is incorporated herein by reference in its entirety.

It is noted that various combinations of layers and materials can be used in the formation of the first and second films, 31 and 50. Accordingly, both films according to the present invention may include any number of layers as so desired.

The fabrication of the laminates of this invention can be accomplished by using any of a number of known methods (e.g., extrusion coating, extrusion lamination, adhesive lamination, tape application). Prior to lamination, the first film may undergo a perforation process, preferably, to create perforations in a predetermined pattern. The patterned perforation may extend along the entire length of the film. An adhesive material is to be used to bond the first and second films together and may be coated onto the surface of one or both films, preferably, in a predetermined pattern. If, as is preferred, an adhesive is applied solely to the first film, the film may have alternating patterns of adhesive and perforations. The alternating patterns may extend along the length of the first film. Depending on the type of adhesive used, a further step of drying or curing of the adhesive may be required after its application. With an adhesive positioned between and in contact with both the first and second films, the films are pressed together, with or without heat, to form the assembled laminate. The steps of contacting and pressing the films together may be accomplished sequentially or simultaneously. The final laminate is then wound around a roller for storage or further processing.

Figure 9:
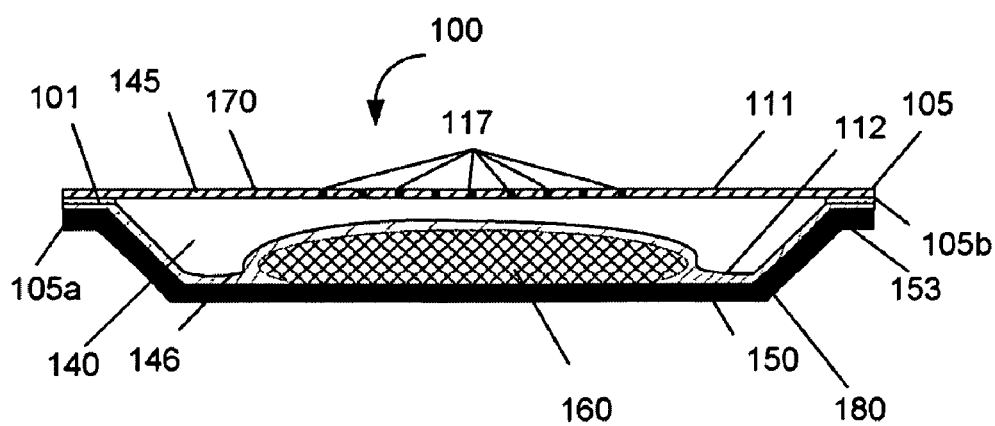
FIG. 9 is a cross-sectional view of one embodiment of a package in accordance with the present invention.

Now turning to FIG. 9, there is illustrated one embodiment of a package according to the present invention. As depicted, package 100 includes a product-support member 150 having an elevated distal flange 153, and a product 160. The product 160 is positioned on the product-support member 150, preferably, with the top of the product being below the top of flange 153. Product-support member 150 may include a rigid or semi-rigid tray that may be formed from mono-layered or multilayered, and thermoformable or non-thermoplastic materials. Rigid and semirigid non-thermoplastic materials may include, but are not limited to, thermosetting plastics, paper, paperboard and cardboard, and formable metals such as metallic foils, e.g., aluminum foil. Rigid and semirigid thermoplastic materials may be used to produce the product-support member 150 by such thermoforming techniques as generally recognized in the art which may include vacuum forming, pressure forming, plug assist or mechanical forming processes. In this embodiment, product-support member 150 is a semirigid or rigid thermoplastic tray. In many instances, the product-support member 150 may include an oxygen barrier material to protect an oxygen-sensitive product from oxygen gas exposure. Examples of such semi-rigid and rigid thermoplastic trays are disclosed by Lisehefski et al., in co-pending U.S. patent application Ser. No. 11/416,966 entitled "Rigid and Semirigid Packaging Articles," which is incorporated herein by reference. Package 100 also includes laminate 101 having a perimeter edge 105 sealed to the distal flange 153. In a preferred embodiment of the invention, at least two opposing perimeter edges 105a and 105b of laminate 101 are heat-sealed to distal flange 153. Laminate 101 comprises a first flexible film 111, a second flexible film 112 adhesively joined to the first film 111, and an adhesive-free interfacial section 140. As depicted, adhesive-free interfacial section 140 includes an unbound portion of the first film 145 and an unbound portion of the second film 146. In one embodiment, unbound portion of the first film 145 and unbound portion of the second film 146 each include at least 50% of the total area of film 111 and 112, respectively. Non-limiting examples of suitable laminates for use in package 100 may include laminates 10, 20 and 30 (as shown in FIGS. 1, 2 and 8, respectively), as described hereinabove. As illustrated in FIG. 9, second flexible film 112 is positioned between the first film 111 and product-support member 150. Package 100 further comprises a substantially horizontal film-surface 170 positioned over product 160 which comprises the unbound portion of the first film 145. The substantially horizontal film-surface 170 is parallel to a plane (not shown) defined between the two opposing perimeter edges 105a and 105b of distal flange 153. Package 100 still further comprises a thermoformed second film-surface 180 which is conformed to the exterior shape of product 160 and includes unbound portion of the second film 146. As shown in FIG. 9, this particular embodiment of the invention includes a plurality of perforations 117 in substantially horizontal film-surface 170 which extend through the entire thickness of the first film 111.

Figure 10:
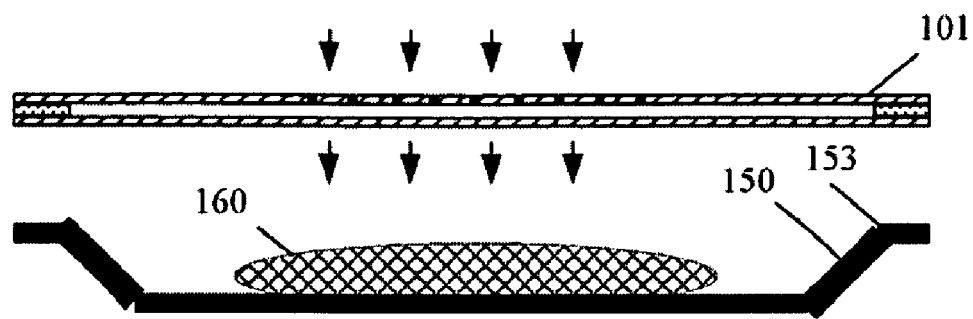
FIG. 10 is a cross-sectional view of one embodiment of a package in accordance with the present invention during a vacuum skin packaging process.
Figure 11:
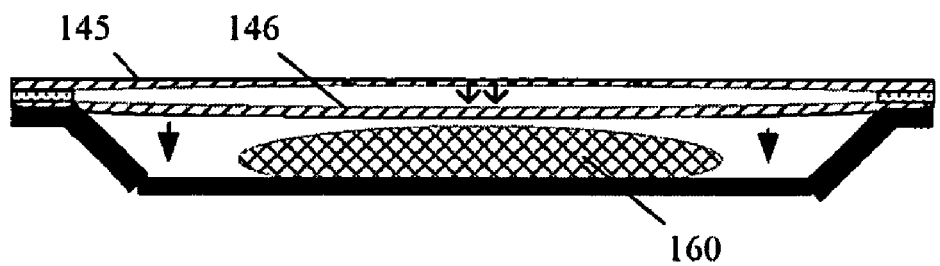
FIG. 11 is a cross-sectional view of the package illustrated in FIG. 10 during a vacuum skin packaging process.
Figure 12:
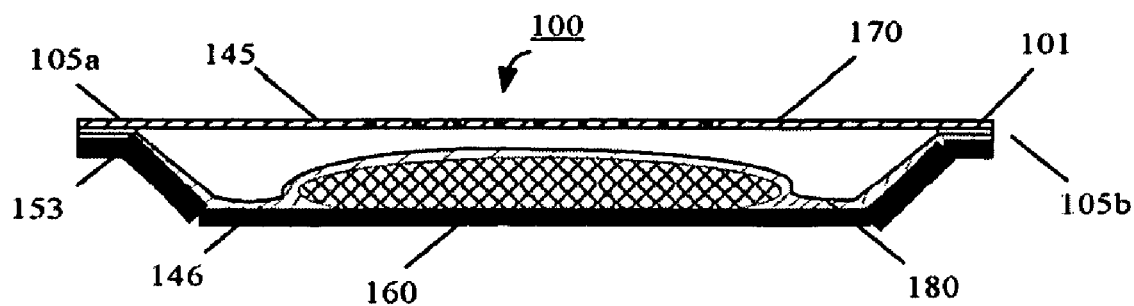
FIG. 12 is another cross-sectional view of the package illustrated in FIG. 10 during a vacuum skin packaging process.

FIGS. 10 through 12 represent a preferred embodiment of a method of forming a package, in part, according to the present invention. During a typical vacuum skin packaging process, laminate 101 and product-support member 150 are subjected to heat and/or differential air pressure, i.e., evacuation and pressurization. As shown in FIG. 10, the force of evacuating the space between laminate 101 and product-support member 150 cause laminate 101 to push or pull towards product-support member 150 until laminate 101 is in contact with distal flange 153. At the pressurization stage in the process, the unbound portions of the first and second films, 145 and 146, will separate from each other as depicted in FIG. 11. In FIG. 12, unbound portion of the second film 146 may then be drawn further towards product 160 and, subsequently conform around the exterior shape of product 160. In this final stage, laminate 101 seals to product-support member 150 by heat-fusion of the exterior surface of laminate 101 to distal flange 153. The steps of sealing of laminate 101 to product-support member 150 and of forming unbound portion of the second film 146 around the exterior shape of product 160 may be accomplished as two sequential steps or simultaneously as one. Preferably, the sealing of laminate 101 includes forming heat-seals to at least two opposing perimeter edges 105a and 105b of laminate 101. When the vacuum skin packaging process is completed, package 100 provides a substantially horizontal first film-surface 170 disposed above product 160 and a thermoformed second film-surface 180 enclosing product 160. Printed indicia previously applied to laminate 101 or a label subsequently applied thereto may be located on the substantially horizontal first film-surface 170 for maximum visibility to the consumer.

It will be apparent to those skilled in the art that modifications and additions can be made to the various embodiments described above, without departing from the true scope and spirit of the present invention. It should be understood that this invention is not intended to be unduly limited by the illustrative embodiments set forth herein and that such embodiments are presented by way of example only with the scope of the invention intended to be limited only by the claims set forth herein as follows.

What is claimed is:

1. A vacuum skin packaging comprising:
   a product support member, and
   a vacuum skin laminate for sealing to the product support member to package a product therein, wherein the vacuum skin packaging laminate comprises:
   (a) a first film integrally formed in the laminate, a second film integrally formed in the laminate and an adhesive bonding the first film to the second film; and
   (b) an adhesive-free interfacial section between the first and second films comprising an unbound portion of the first film and an unbound portion of the second film; wherein the unbound portion of the first film includes at least one perforation, cut or score-line, extending through the entire thickness of the first film, and the unbound portion of the second film is free of a perforation, cut and score-line;
   and wherein the vacuum skin packaging laminate has
   (c) an unsealed state where the laminate is not sealed to the product support member and a sealed state where the laminate is sealed to the product support member;
   (d) wherein when the laminate is in the unsealed state and a lay-flat condition, the unbound portion of the first film is separated from the unbound portion of the second film by a distance no greater that the thickness of the adhesive bonding the first film to the second film;
   and wherein the vacuum skin packaging is formed that when the laminate is in the sealed state, the unbound portion of the first film is separated from the unbound portion of the second film by a distance greater that the thickness of the adhesive bonding the first film to the second film, and the unbound portion of the second film is disposed substantially horizontal above the base of the product support member and has a thermoformable film-surface which is conformed to the shape of the product in response to application of heat and differential air pressure thereto.

2. The laminate set forth in claim 1 wherein the adhesive comprises a pattern-applied adhesive.

3. The laminate set forth in claim 1 wherein the adhesive comprises a polyurethane adhesive.

4. The laminate set forth in claim 1 wherein the adhesive comprises a continuous or intermittent pattern.

5. The laminate set forth in claim 1 wherein the first film comprises a multilayer thermoplastic film.

6. The laminate set forth in claim 1 wherein the second film comprises a heat-sealable layer.

7. The laminate set forth in claim 1 wherein the second film comprises a multilayer thermoplastic film.

8. The laminate set forth in claim 1 wherein the second film has an oxygen transmission rate therethrough of between 0 to 5 $cm^3$/100 $in^2$/24 hours.

* * * * *

UNITED STATES PATENT AND TRADEMARK OFFICE
CERTIFICATE OF CORRECTION

PATENT NO. : 8,047,368 B2
APPLICATION NO. : 12/018261
DATED : November 1, 2011
INVENTOR(S) : Otacilio Teixeira Berbert and Douglas Mark Latreille It is certified that error appears in the above-identified patent and that said Letters Patent is hereby corrected as shown below:

Column 2, line 10, "beat" should read --heat--.
Column 3, line 19, "by" should read --be--.
Column 4, line 39, "which may fluid adhesives" should read --which may be fluid adhesives--.
Column 4, line 57, "amber" should read --rubber--.
Column 8, line 29, "142 mil" should read --1.42 mil--.
Column 9, line 5, "117" should read --1.17--.

Signed and Sealed this
Thirtieth Day of October, 2012

David J. Kappos
*Director of the United States Patent and Trademark Office*